(12) United States Patent
Voegele

(10) Patent No.: US 6,725,014 B1
(45) Date of Patent: Apr. 20, 2004

(54) METHOD AND SYSTEM FOR CONTENTION RESOLUTION IN RADIO FREQUENCY IDENTIFICATION SYSTEMS

(75) Inventor: Kevin D. Voegele, Shakopee, MN (US)

(73) Assignee: Honeywell International, Inc., Morristown, NJ (US)

( * ) Notice: Subject to any disclaimer, the term of this patent is extended or adjusted under 35 U.S.C. 154(b) by 401 days.

(21) Appl. No.: 09/641,384

(22) Filed: Aug. 17, 2000

(51) Int. Cl.[7] .............................. H04B 7/00; H04Q 5/22
(52) U.S. Cl. .................. 455/41.2; 340/10.2; 340/10.32; 340/10.42
(58) Field of Search ................... 455/41.1, 41.2; 340/5.61, 572.1, 10.2, 10.3, 5.1, 10.4, 572.4, 10.31, 505, 10.32, 10.33, 10.42, 825.02, 825.59; 375/283; 342/42, 44; 235/385, 435

(56) References Cited

U.S. PATENT DOCUMENTS

| | | | | |
|---|---|---|---|---|
| 5,339,073 A | * | 8/1994 | Dodd et al. ................ | 340/5.61 |
| 5,550,547 A | * | 8/1996 | Chan et al. ................ | 342/42 |
| 5,673,037 A | * | 9/1997 | Cesar et al. ............... | 340/10.32 |
| 5,986,570 A | * | 11/1999 | Black et al. ................ | 340/10.2 |
| 6,091,319 A | * | 7/2000 | Black et al. ................ | 340/10.2 |
| 6,265,962 B1 | * | 7/2001 | Black et al. ................ | 340/10.2 |
| 6,377,203 B1 | * | 4/2002 | Doany ....................... | 342/44 |
| 6,456,191 B1 | * | 9/2002 | Federman ................... | 340/10.2 |
| 6,469,618 B1 | * | 10/2002 | Gaultier ..................... | 340/10.3 |

FOREIGN PATENT DOCUMENTS

EP  0 935 222  8/1999  ............ G07C/9/00

OTHER PUBLICATIONS

International Search Report from International Application No. PCT/US01/24997, dated Mar. 7, 2002.

\* cited by examiner

*Primary Examiner*—Charles Appiah
*Assistant Examiner*—Rafael Perez-Gutierrez
(74) *Attorney, Agent, or Firm*—McDonnell Boehnen Hulbert & Berghoff (57) ABSTRACT

A method and system for resolving contentions among passive identification tags. A reader may divide a possible range of tag values into a number of smaller ranges. For each smaller range, the reader may then poll the tags to determine which tags have tag values that fall within the smaller range. If more than one tag responds simultaneously, then the reader may further divide the smaller range into even smaller ranges and poll the tags with respect to those even smaller ranges. Once the range partition gets small enough, the reader may then opt to poll the tags for a match of each possible value in the range, rather than partitioning further. This arrangement enables the reader to efficiently identify tags, by quickly eliminating from analysis any range of tag values to which no tags match or only one tag matches.

12 Claims, 6 Drawing Sheets

METHOD AND SYSTEM FOR CONTENTION RESOLUTION IN RADIO FREQUENCY IDENTIFICATION SYSTEMS

FIELD OF THE INVENTION

The present invention relates to a field of radio frequency tag identification. More specifically, the present invention relates to a method for resolving contention in identification of a plurality of radio frequency tags.

BACKGROUND OF THE INVENTION

The object of any Radio Frequency Identifications ("RF ID") system is to carry data in suitable transponders, generally known as tags, and to retrieve data, by machine-readable means, at a suitable time and place to satisfy particular application needs. The word "transponder", derived from TRANSmitter/resPONDER, reveals the function of a tag, which usually responds to a transmitted request or a communicated request for data it carries. The data in the tag may provide identification information for an item, a location, an identity of a vehicle, an animal, a person or other information.

Radio frequency identification systems are typically categorized as either "active" or "passive". In an active RF ID system, tags are powered by an internal battery, and data written into active tags may be rewritten and modified. In a passive RF ID system, tags operate without an internal power source and are usually programmed with a unique set of data that cannot be modified. A typical passive RF ID system comprises two components: an interrogator (reader) and a plurality of passive tags. The main component of every passive RF ID system is a plurality of information carrying tags that respond to a coded RF signals that are typically sent from the reader.

A passive tag typically includes an antenna and a semiconductor chip comprising radio frequency ("RF") circuitry, logic and a non-volatile memory unit. Further, a time-varying electromagnetic RF signal (carrier signal) that is typically transmitted by a reader located at a base station energizes the passive tag. The reader usually comprises a microcontroller-based unit with a wound output coil and detector hardware. In a typical configuration, in addition to the reader, the base station comprises an antenna, an RF transmitter and an RF receiver. The reader may issue commands to the RF transmitter and receive commands from the RF receiver. The commands may serve to identify a plurality of tags present in a reader's field of view. The size of the reader's field of view depends primarily on a power level of the RF signal transmitted from the reader.

The RF transmitter at the base station may, for instance, encode a command from the reader, modulate the command to a radio frequency signal and, then, pass it to the antenna located at the base station. The RF receiver at the base station may receive, demodulate and pass to the reader return signals from the plurality of RF tags in the reader's field of view.

As known in the art, a passive tag is not a transmitter, yet a bi-directional communication is taking place in passive RF ID systems. The passive tag may employ a process called a backscatter modulation to send data to a reader. In a typical system, the reader continuously generates an RF carrier sine wave and senses for occurrences of a modulation, which would indicate a presence of a tag in a reader's field of view. When a tag enters the reader's field of view and, further, receives sufficient energy to operate, the tag typically divides down the RF carrier sine wave and, subsequently, starts clocking out identification data from a non-volatile memory unit, such as programmable registers.

The tag may clock out the identification data to an output transistor, which is typically connected to the tag's input coils. Consequently, the tag's output transistor may sequentially shunt the coil correspondingly to data that is clocked out from the non-volatile memory unit. Shunting the coil causes a momentary fluctuation of the carrier wave, which results in a slight change in an amplitude of the carrier wave and, thus, the reader may peak-detect the amplitude-modulated data and process the resulting bitstream according to encoding and modulation methods used in a particular RF ID system. This amplitude-modulation loading of the reader's transmitted field provides a communication path back to the reader.

In a modem business, maintaining an accurate inventory of merchandise is crucial. For instance, in a rental video store, a tag could be attached to each video tape in the video store, and one or more readers could then be used to maintain an inventory of video tapes. Further, it is often crucial to quickly determine what tags are in a given area.

There are many procedures that readers in RF ID systems may use to verify identification of a plurality of tags in readers' fields of view. In this regard, each tag in a reader's field of view may have an associated identification value that is stored cooperatively in a number of identification registers on the tag. Typically, for example, a tag may have a 36-bit identification value that is stored in three 12-bit identification registers. Further, each tag may have a corresponding set of counters (i.e., typically, three 12-bit counters) that can be controlled by carrier signals sent from a reader. A reader may send RF instruction signals to the tags in its field of view, which may cause actions to be taken with respect to the tags' counters and identification registers, so as to, in turn, modify the RF carrier and indicate the presence of the tags. One such instruction, for instance, may be an initialize instruction, which causes a recipient-tag to initialize a specified counter or counters. Another such instruction, for instance, may be an increment instruction, which causes a recipient-tag to increment a specified counter or counters.

According to one of the commonly used procedures for tag identification, a reader may first send an initialization instruction signal out to any tags in its field of view, directing the tags to initialize their first counters to zero. The reader may then sequentially transmit increment instructions to the tags, causing the tags to sequentially increment their first counters. Given 12 bits per register, in a typical arrangement, the reader may thus send out 4095 increment instructions.

When a count on the first counter of a tag matches a coded identification value on the tag's associated first identification register, the tag may then be arranged to respond to the reader by shifting out its complete identification value from all of its identification registers, thereby modifying the RF carrier to indicate the presence of the tag. Further, the tag may also shift out additional bits, such as a checksum (e.g., an 8-bit checksum), for instance. In this manner, if only one tag responds to the reader, the reader may properly detect that tag's identification and conclude that the tag is present.

However, this approach can suffer from a problem known as a contention. Contention occurs when more than one tag selects the same time slot for transmission of an identification coded value. This can occur in the process described above, for instance, if more than one tag's first counter matches the coded value in its first identification register. As a result, more than one tag will responsively send their full identification values and checksums to the reader. When is contention occurs, the reader is simultaneously bombarded with more than one tag's identification code and checksum in the same time slots. From the reader's perspective, a single identification code and checksum arrives, but the checksum will not be correct. Consequently, the reader will not be able to correctly detect the identification of each responding tag.

If contention occurs in the process above, according to common practice (known as the "partial read" method), the reader may keep the first counters of the tags in the field of view at the contending count (i.e., by not further incrementing the first counters) and may initiate counting on the second counters of the tags in the reader's field of view. In turn, when (i) the first contending count matches the tag's first identification register and (ii) a count on the tag's second counter matches the tag's second identification register, the tag may be arranged to respond to the reader by shifting out its complete identification value from all of its identification registers. If a contention then occurs with respect to the second counters, the reader may then similarly use the remaining counter(s) of the tags to resolve the contention. In this manner, the reader may detect identification data of all tags in the reader's field of view.

SUMMARY

While the partial read method provides a mechanism for resolving a contention that occurs between a plurality of tags in a reader's field of view, the method is not particularly efficient. For example, the method can take a long time to gather all identification information of the tags in the reader's field of view. In particular, for instance, if two tags in the field of view have the respective identification codes 4095:4095:4094 and 4095:4095:4095 (encoded in their respective three 12-bit registers), the reader may be forced to increment entirely through all three counters resolving the contention. That would mean that the tags would have to increment $2^{12}+2^{12}+2^{12}$ counts on three counters associated with the registers. For applications that require quick reading of tag identification values, this amount of work is undesirable.

An exemplary embodiment of the present invention provides a more efficient method of contention resolution, employing a sort of tree-splitting algorithm. Generally speaking, for each counter for instance, the reader may first check to see whether the tags in its field of view have identification codes falling within a given range of values. If only one does, or if none do, then the reader is done with respect to that counter.

If more than one does, then the reader may repeatedly divide and test the specified range until there is no contention or until the range reaches a predetermined limit (e.g., if it gets too small). In particular, for instance, the reader may split the range in half (or in some other number of range segments) and, with respect to each half, may check to see whether the tags in its field of view have identification codes that match that half. With respect to each half in which the reader discovers a contention, the reader may in turn split the half in two again and repeat the process. In this way, the reader can quickly eliminate large sections of the counter if no tags exist in those sections.

For example, a reader may send to a plurality of tags a range-instruction signal that indicates a specified range of values of the first identification register. The instruction signal may instruct the tags to respond (i.e., to clock out their full identification values onto the RF carrier) if the value in their first identification register falls within the specified range. Each tag may thus have logic arranged to determine whether a value on a given identification register is within a specified range and, if so, to responsively transmit its identification code and a checksum.

If the reader detects an identification code and a correct checksum, the reader may conclude that only one tag has an identification value falling within the specified range. Similarly, if the reader receives no response, the reader may conclude that no tag has an identification value falling within the specified range. In either case, the reader may then proceed to perform the same process with respect to the other identification registers as well.

If a contention occurs, however, the reader may split the specified range in half, so as to produce two range segments, a lower segment and a higher segment. With respect to each range segment, the reader may then send a new range-instruction signal, indicating the range segment as the specified range. If the reader receives no response for a given range segment, the reader may efficiently eliminate that entire range segment from further consideration, focusing instead on the other range segment(s).

Each register or group of registers can be analyzed in up to any number of sub-segments. In the exemplary embodiment, for instance, each 12-bit register can be analyzed in 8 range segments each of 512 counts. With this arrangement, the reader may first check two range segments [0 to 2047] and [2048 to 4095]. In response to a contention in the range segment [0 to 2047], the reader may check the two range segments [0 to 1023] and [1024 to 2047]; and, in response to a contention in the range [2048 to 4095] the reader may then check the two range segments [2048 to 3071] and [3072 to 4095]. Continuing in this way, the reader may ultimately check the following eight range segments: [0 to 511], [512 to 1023], [1024 to 1535], [1536 to 2047], [2048 to 2559], [2560 to 3071], [3072 to 3583], and [3584 to 4095].

If the reader still has a contention in a given range segment, the reader may more readily perform the partial read method described above within the minimum sized range segment, for instance, in an effort to identify the tags in the range segment. In turn, if the reader still has a contention, the reader may then move on to analyze to the next identification register.

Thus, in one respect, an exemplary embodiment of the invention may take the form of a method for identifying a plurality of passive identification tags in a field of view, where each tag has a respective identification value, and each tag has a register value within a predetermined range. The method may involve first splitting the predetermined range into multiple first sub-ranges and then, for each first sub-range, requesting each tag whose register value falls within the first sub-range to communicate the tag's identification value. In response to a determination that more than one tag has a register value within a given first sub-range, the method may then involve splitting the given first sub-range into multiple second sub-ranges and, for each second sub-range, requesting each tag whose register value falls within the second sub-range to communicate the tag's identification value.

Still further, in response to a determination that more than one tag has a register value within a given second sub-range, the method may involve applying the partial read method to identify all tags whose register values fall within the given second sub-range. And yet further, in response to a determination that more than one tag has a register value within a given second sub-range, the method may involve splitting the given second sub-range into a plurality of third sub-ranges and, for each third sub-range, requesting each tag whose register value falls within the third sub-range to communicate the tag's identification value.

Each tag may be a radio frequency identification tag, for instance. Further, each tag may, for instance, have several registers with a unique value permanently encoded in each register, and each tag's identification value may then be defined as a combination of the tag's respective register values.

In addition, the predetermined range may have a predetermined size, such as 4096 possible values (e.g., from 0 to 4095) for instance. Further, each of the multiple first sub-ranges may have a first size that is half of the predetermined size. Still further, each of the multiple second sub-ranges may have a second size that is half the first size, and each of the multiple third sub-ranges may have a third size that is half of the second size. Of course, other sizes are possible as well.

In another respect, an exemplary embodiment may take the form of a reader that is programmed to perform a method such as that described above. Alternatively, an exemplary embodiment may take the form of a passive identification system that includes a reader and a plurality of passive identification tags. Each tag may have a respective identification value, and each tag may have a register value within a predetermined range. The reader may be arranged to send a number of range-instructions to the tags, each indicating a search range. And each tag may be arranged to receive each range-instruction and to responsively determine whether the tag's register value falls within the specified search range. With this arrangement, the reader may apply a recursive partitioning and searching method such as that described above.

These as well as other aspects and advantages of the present invention will become apparent to those of ordinary skill of art by reading the following detailed description, with reference where appropriate to the accompanying drawings.

BRIEF DESCRIPTION OF THE DRAWINGS

An exemplary embodiment of the present invention is described below with reference to the drawings, in which.

DETAILED DESCRIPTION OF AN EXEMPLARY EMBODIMENT

1. System Architecture

Figure 1:
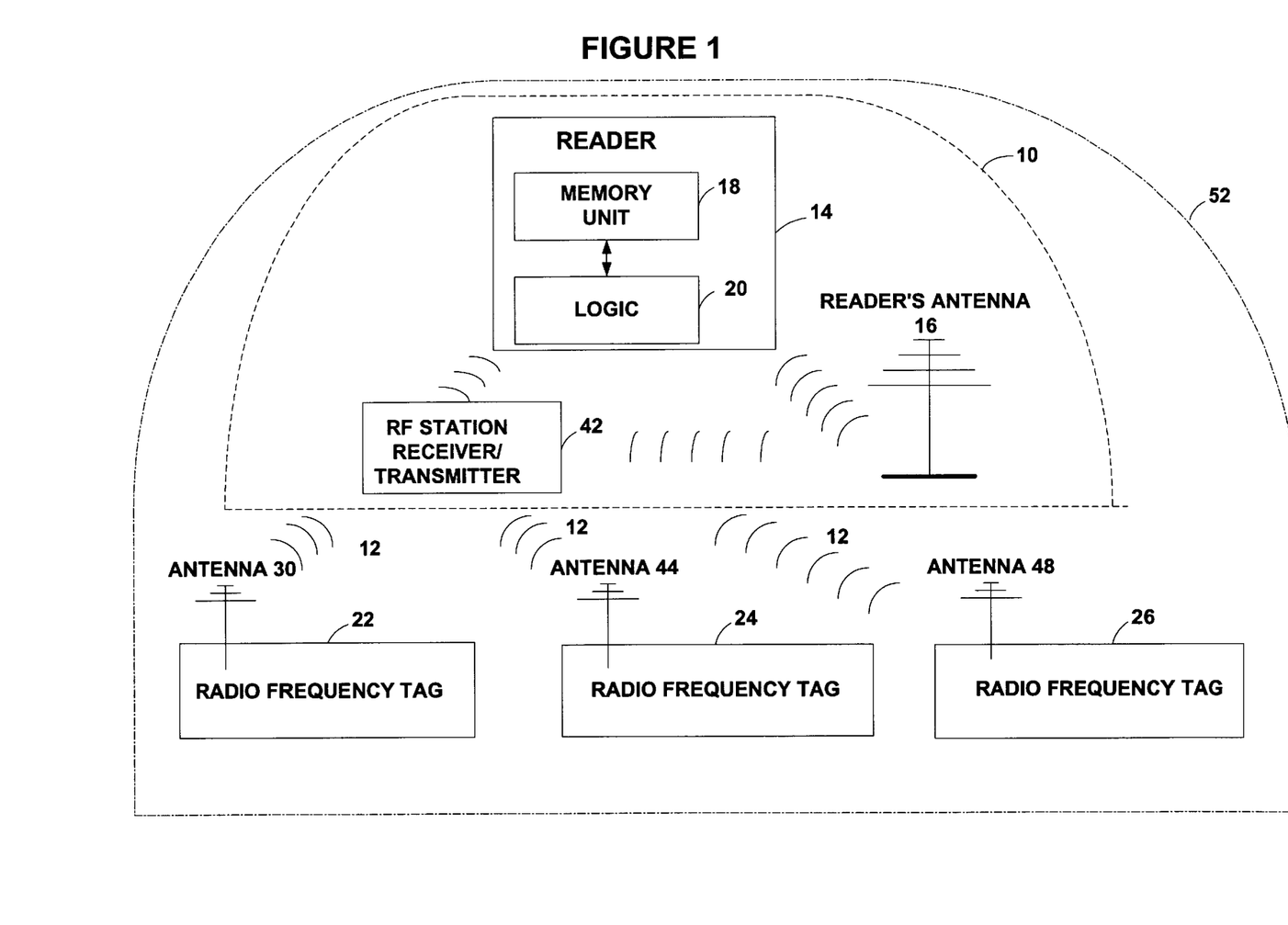
FIG. 1 is a block diagram illustrating a radio frequency identification system employing an exemplary embodiment of the present invention.

Referring to the drawings, FIG. 1 is a block diagram illustrating an RF-ID system arranged to employ exemplary embodiments of the present invention. As shown in FIG. 1, a base station 10 communicates with three passive RF tags 22, 24 and 26 via a wireless network across the space of an air interface 12. FIG. 1 illustrates only three tags. However, a typical RF-ID system may comprise up to a large number of RF tags. Exemplary base station 10 comprises a reader 14, a reader's antenna 16 and an RF station 42. RF station 42, in turn, comprises an RF transmitter and an RF receiver (not shown) that may transmit/receive RF signals via reader's antenna 16 to/from passive RF tags 22, 24 and 26.

Reader 14 includes a memory unit 18 and a logic unit 20. Memory unit 18 may store application data and identification information (e.g., tag identification numbers) of RF tags in a reader's field of view 52 (RF signal range) of reader 14. Memory unit 18 may also store data comprising sets of instructions for reader 14 to communicate with RF tags 22, 24 and 26. Reader 14 may retrieve the instructions from memory unit 18 and send the instructions to the RF tags in reader's field of view 52.

Logic unit 20 may comprise, for instance, a digital processor (e.g., processor programmed with a set of machine language instructions to carry out the various functions described herein) and counter/clock registers. Logic unit 20 may, for instance, control commands that are sent from reader 14 to the tags in reader's field of view 52, control sending and receiving of RF signals via RF station 42 and reader's antenna 16, and determine if a contention has occurred, for instance. Logic unit 20 may perform other functions as well or instead.

Reader 14 may comprise a plurality of additional components. Typically, readers differ quite considerably in complexity, depending upon a type of tags in readers' fields of view and functions to be fulfilled in radio frequency systems. However, an overall fiction of any reader may be to provide a communicating functionality and to facilitate data transfer between the reader and the tags. Additionally, tasks performed by readers may include sophisticated signal conditioning, parity checking and correction schemes, for instance.

Reader 14 may also be connected to a computer (not shown) or other entity. The computer may be co-located with the reader 14 (commonly for a stationary reader, for instance) or the computer may be physically separate from reader 14 (commonly for a portable reader, for instance). A connection between reader 14 and the computer may be a hard-wired and/or wireless connection. In an RF-ID system comprising a computer, the computer may perform high level processing functions that are not performed by reader 14, the computer may control some or all of the operation of reader 14, or the computer may perform other functions. For instance, the computer may compile lists of identification information received from the tags in reader's field of view 52, or it may direct handling of contentions.

Once reader 14 is turned on, reader 14 preferably starts continuously generating an RF signal that defines a field of view 52. A range of reader's field of view 52 typically depends on a power level of the RF signal generated by reader 14. Typically, the RF signal that is delivered from reader's antenna 16 extends into a space and diminishes in strength over a distance from reader 14. Thus, a design of antenna 16 may determine a shape and orientation of reader's field of view 52 and consequent wave paths.

Figure 2:
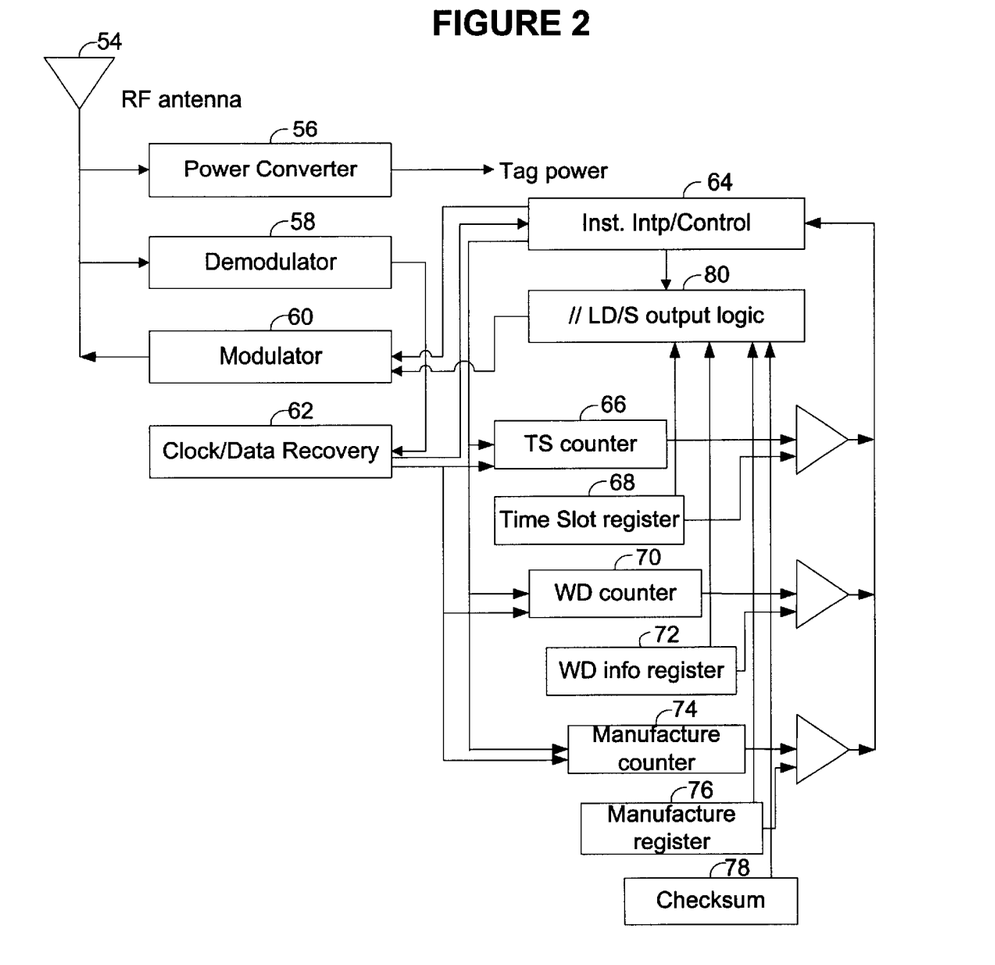
FIG. 2 is a circuit block diagram of an exemplary tag.

As mentioned above, reader 14 communicates with tags 22, 24 and 26 through reader's antenna 16 and via air interface 12. According to the exemplary embodiment, tags 22, 24 and 26 could be fabricated as low power integrated circuits, or they could employ aspects of a well-known "coil-on-chip" technology for a data transfer and a power generation. FIG. 2 shows an exemplary block diagram of each RFID tag in field of view 52 according to the exemplary embodiment of the present invention. The exemplary block diagram is described only by a way of an example, and more, fewer or other functional elements could also be employed without departing from the scope of the invention.

As shown in FIG. 2, each RF-ID tag includes at least one antenna 54, a power converter 56, a demodulator 58, a modulator 60, a clock/data recovery circuit 62, an instruction interpreter/control unit 64, a time slot counter 66, a timer slot register 68, a wafer data counter 70, a wafer data register 72, a manufacture information counter 74, a manufacture information register 76, a checksum 78 and a load-shift ("LD/S") output logic 80. In the exemplary embodiment, antenna 54 may be an omnidirectional antenna, with its impedance matched to a transmission frequency of reader 14.

In the exemplary embodiment, prior to any other functional operation, reader 14 transmits a charging signal that serves to establish power for each tag in reader's field of view 52. The charging signal could be a 915±13 MHz carrier frequency signal, for instance. However, different carrier signals could also be used. When a tag in the reader's field of view 52 receive the charging signal, the tag's power converter 56 may convert the received signal to a 2.5 V DC supply rail capable of a 5 $\mu$A continuous power, for instance.

In addition, demodulator 58 may also receive the 915±13 MHz carrier frequency signal from antenna 54. In the exemplary embodiment, the reader may modulate onto the carrier signal one or more instruction signals that may be associated with a tag identification process, as will be further described below. Therefore, the demodulator 58 may receive the modulated carrier bearing those instructions.

Instruction interpreter/control unit 64 receives instructions from demodulator 58 via clock/data recovery unit 62, which may derive a 65 kHz clock signal for tags from the carrier frequency signals received from reader 14. When instruction interpreter 64 receives a valid command instruction from reader 14, it may provide control signals to one or more counters, each of which may have a corresponding register.

In the exemplary embodiment, as shown in FIG. 2, three counters are provided and are designated, respectively, as time slot counter 66, wafer data counter 70 and/or manufacture information counter 74. Each of these counters in turn is associated with a corresponding register, designated respectively as time slot register 68, wafer data register 72, and manufacture to information register 76. Each counter is preferably the same size as its corresponding register, to facilitate comparison between counter values and register values. In the exemplary embodiment, each counter is 12 bits long, and each corresponding register is therefore also 12-bits long. Therefore, each register and counter can represent a total of 4096 numbers, from 0 to 4095. However, the counters and/or registers can be other (larger or smaller) sizes instead.

Each register may be a laser programmable register, for instance, or may take other forms. At the time of manufacture, each register may be permanently programmed with an identification code, which may be used to help identify the tag. These identification codes might be randomly or serially assigned or may serve a more specific purpose. For example, wafer data register 72 might serve to identify a wafer lot number and wafer segment, and manufacture information register 76 might serve to identify a date and location of manufacture of the tag. Other examples are possible as well.

In the exemplary embodiment, checksum 78 may be an 8-bit checksum, and it may be computed by adding data contained in fuse link codes. (Fuse links, as known in the art, are wires that connect an input of a register to a logic "1" or "0". A fuse link is initially "fused open" so that it may be later programmed with a "1" or "0".) However, checksum 78 may be computed in another manner instead. Further, it may be of another size (i.e., more or fewer bits).

When a tag in field of view 52 transmits identification data back to reader 14, according to the exemplary embodiment, the tag may transmit a 36-bit identification code and an 8-bit checksum. The 36-bit identification code is preferably the combination of the three 12-bit codes stored respectively in registers 68, 72 and 76, and the 8-bit check sum is preferably checksum 78. According to the exemplary embodiment, LD/S output logic 80 is used to monitor outputs of programmable registers 68, 72, 76 and of checksum 78. LD/S output logic 80 could control the function of the counters to either set them up as counters or shift-registers. In the exemplary embodiment, once a match for a range search is found, LD/S output logic 80 may load the tag's identification to the registers and shift out the identification value to reader 14.

Once reader 14 is turned on, reader 14 may continuously generate an RF signal that creates field of view 52. Reader 14 may then retrieve from memory unit 18 a set of identification instructions to initiate tags' actions. According to the exemplary embodiment, one such instruction may be a range-instruction. The range-instruction may carry an instruction identifier (indicating that it is a range-instruction with respect to a particular register, for instance) and then a "preset" value, which may be one or more parameters specifying a particular range of values on a particular register.

In an exemplary embodiment, to start, the range-instruction may be directed to an analysis of time slot register 68, for instance. For this purpose, the range-instruction identifier may be 101010, for example, which the reader and each tag may be programmed to associate with a range search with respect to register 68. The instruction identifier may, however, take other forms instead.

Further, by way of example, the preset value may comprise two 4-bit numbers, one of which indicates the four most significant bits (MSB) for an upper bound and the other of which indicates the four MSB for a lower bound. Thus, for a given 12-bit register, the preset may indicate bits UUUU for the upper bound and bits LLLL for the lower bound. The range of possible values may therefore extend from the value "LLLL xxxx xxxx" up to "UUUU xxxx xxxx", where "xxxx xxxx" represent the least significant 8 bits of the register. In this manner, each of the least significant 8 bits of the register may correspond with a respective 512 count range as noted above. However, the preset range parameter(s) may take any other form as well. For instance, more or fewer most significant bits could be specified depending on the number of bits associated with the coded value in a given register, or the parameters may take another form altogether.

To facilitate a determination of whether a register value falls within the specified range defined in the range-instruction, the tag may include a set of range identifying logic. This range identifying logic may be provided separately in conjunction with each counter/register. Alternatively, the instruction interpreter/control logic 64 may include the range identifying logic. In such an embodiment, when the range identifying logic determines that a register value is in a specified range, an output of the range identifying logic is provided to the each register to cause the registers to shift out their identification values to reader 14 via LD/S output logic 80. Additionally, checksum 78 is also preferably shifted out to logic 80. Other arrangements are possible as well.

Figure 3:
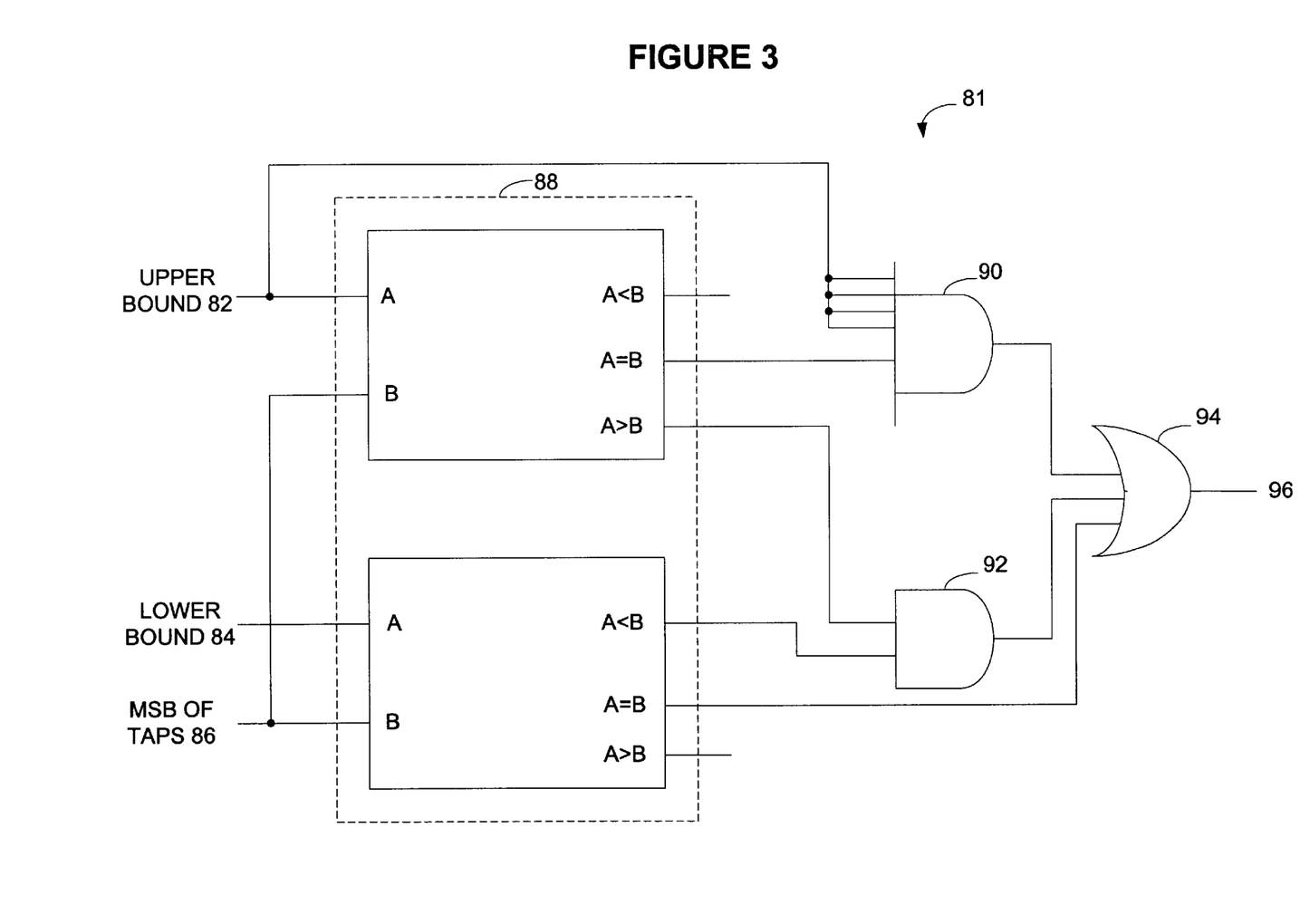
FIG. 3 is a block diagram illustrating how a register may be divided and how search ranges may be defined in accordance with an exemplary embodiment.

FIG. 3 illustrates an exemplary schematic of a set of range identifying logic 81. Logic 81 assumes by way of example that reader 14 sends a range-instruction that provides an 8-bit preset value defining 4 MSB of an upper bound and 4 MSB of a lower bound as described above. As shown in FIG. 3, range identifying logic 81 comprises "compare" logic 88, two logic "AND" gates 90, 92 and one logic "OR" gate 94. Compare logic 88 could be a digital comparator comprising 59 logic gates, for instance, and can be readily prepared to carry out the functions described herein.

For instance, the preset value carried by the range-instruction may provide as range parameters an upper bound value 82 and a lower bound value 84, both of which become inputs to compare logic 88. Further, compare logic 88 has as another input a value 86, which is the four most significant bits of the register at issue. Thus, in operation, logic 88 may serve to determine whether value 86 falls within the range from value 82 to value 84.

In particular, for instance, logic 88 may determine whether input 82 is greater than or equal to input 86 and whether input 84 is less than input 86. If these conditions are met, then logic 81 will provide a true output 96. In the exemplary embodiment, this would therefore result in a test of whether the register bits fall within the specified range up to but not including the upper bound value. In addition, exemplary logic 81 may also test separately for the condition that the most significant bits of the register at issue are "1111" and the upper bound is also "1111", since this condition would not otherwise be tested in the exemplary embodiment. If this additional condition is met, logic 81 also preferably provides a true output 96.

In response to a true output 96, instruction interpreter/control unit 64 may cause time slot register 68, wafer information register 72, manufacture information register 76 and checksum 78 to shift their values to LD/S output logic 80. In the exemplary embodiment, the true output 96 may set up a load operation of the LD/S output logic 80, and a tag may receive a command from reader 14 to shift out its identification value. Thus, LD/S output receives (i) three 12-bit identification values, cooperatively defining a 36-bit identification code for the tag and (ii) an 8-bit checksum for that 36-bit identification code.

When LD/S output logic 80 receives the 36-bit identification code from the registers 68, 72, 76 and 8-bit checksum from checksum 78, LD/S output logic 80 may shift a 44-bit coded value to modulator 60 for transmission to reader 14. Modulator 60 may use modulated RF signals to transmit the 44-bit coded value to reader 14 via antenna 54. In an exemplary embodiment, a modulated RF signal comprising the 44-bit coded value could be transmitted to reader 14 at about 65 kHz. Further, because clock/data recovery unit 62 derives the clock for tags from signals that it receives from reader 14, any type of data sent from tags, such as 44-bit identification value, may be clock-synchronized with reader 14. Thus, according to the exemplary embodiment, additional clock-synchronization is not necessarily required.

2. Contention Resolution

According to an exemplary embodiment, the radio frequency identification system as shown in FIG. 1 uses a partition/scratch and count subset ("PSCS") method to efficiently and effectively resolve contention occurrences and, thus, to quickly gather identification information of all tags in reader's field of view 52. To apply the PSCS method in RF system, registers 66, 70 and 74 of tags are divided into a number of segments, such that several smaller segments may be combined to form a fixed size larger segment, for instance. According to an exemplary embodiment, each 12-bit register is partitioned into 8 fixed-size segments, and each segment covers 512 counts (i.e., register values). These segments may thus be combined to form a larger segments such as segments having 1024 counts and 2028 counts, for instance. However, the present invention is not limited to partitioning each register of the tags in reader's field of view 52 into 8 segments, and more or fewer segments could be used instead, and the segments could vary in size among each other.

Figure 4:
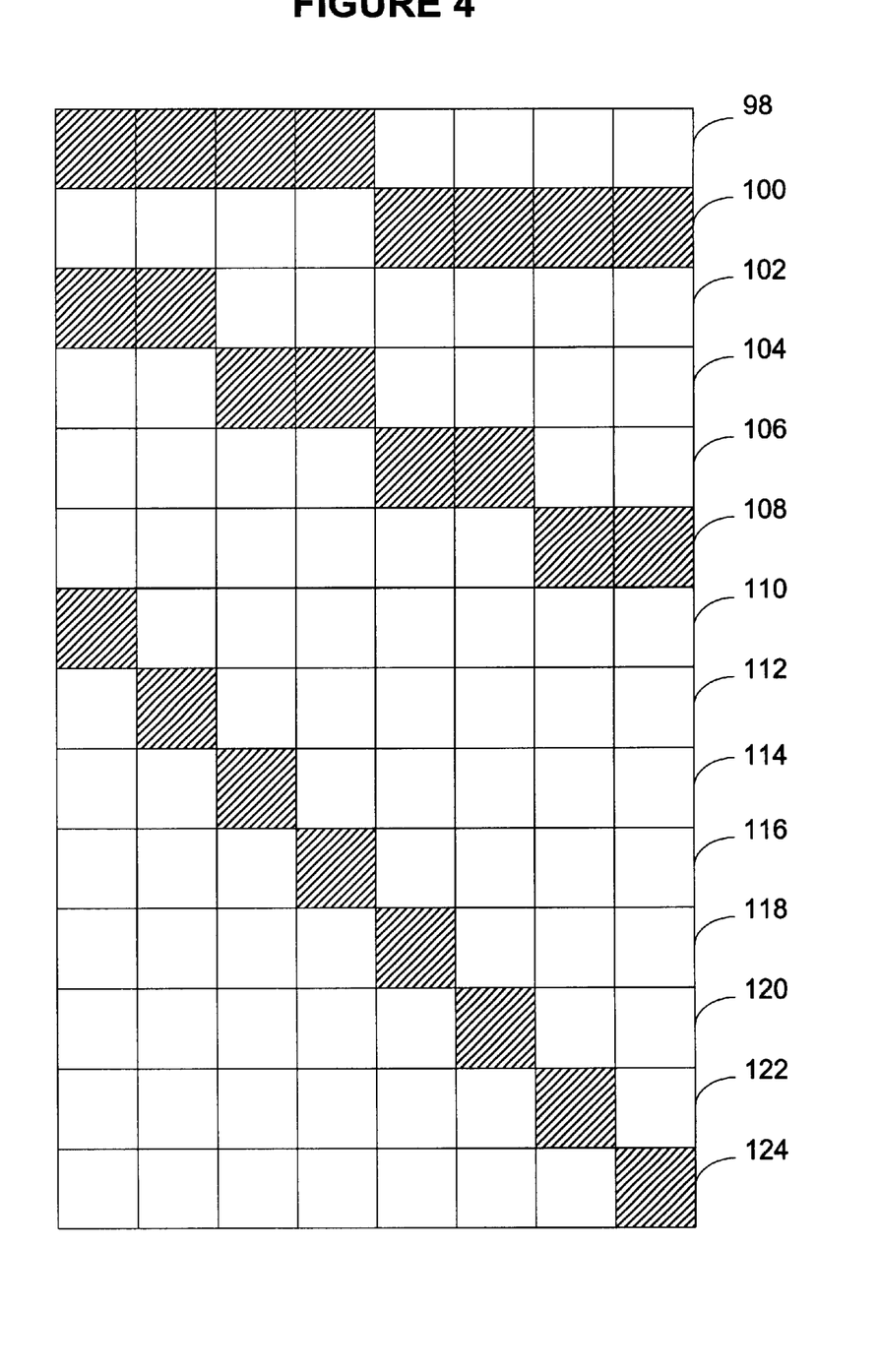
FIG. 4 is a schematic of a range identifying logic that may be used to search for tags having certain register values in accordance with an exemplary embodiment.

FIG. 4 shows how a 12-bit counter/register could be divided into 8 segments having 512 counts each, designated by reference numerals 110, 112, 114, 116, 118, 120, 122 and 124. Further, FIG. 4 shows how these segments could be combined to form larger segments, designated by reference numerals 108, 106, 104, 102, 100 and 98.

Table 1 below shows four most significant bits ("MSB") corresponding to an upper bound search and four most significant bits corresponding to a lower bound search associated with each segment shown in FIG. 4. In Table 1, the segment numbers listed in the first column correspond respectively to the segment reference numerals used in FIG. 4. It should be understood that the values listed in Table 1 are provided for purposes of example only, and that and segment sizes may be used in addition or instead.

TABLE 1

| Segment Number | MSB Upper Bound Search | MSB Lower Bound Search |
| --- | --- | --- |
| 98 | 1111 | 1000 |
| 100 | 1000 | 0000 |
| 102 | 1111 | 1100 |
| 104 | 1100 | 1000 |
| 106 | 1000 | 0100 |
| 108 | 0100 | 0000 |
| 112 | 1110 | 1100 |
| 114 | 1100 | 1010 |
| 116 | 1010 | 1000 |
| 118 | 1000 | 0110 |
| 120 | 0110 | 0100 |
| 122 | 0010 | 0001 |
| 124 | 0001 | 0000 |

Figure 5:
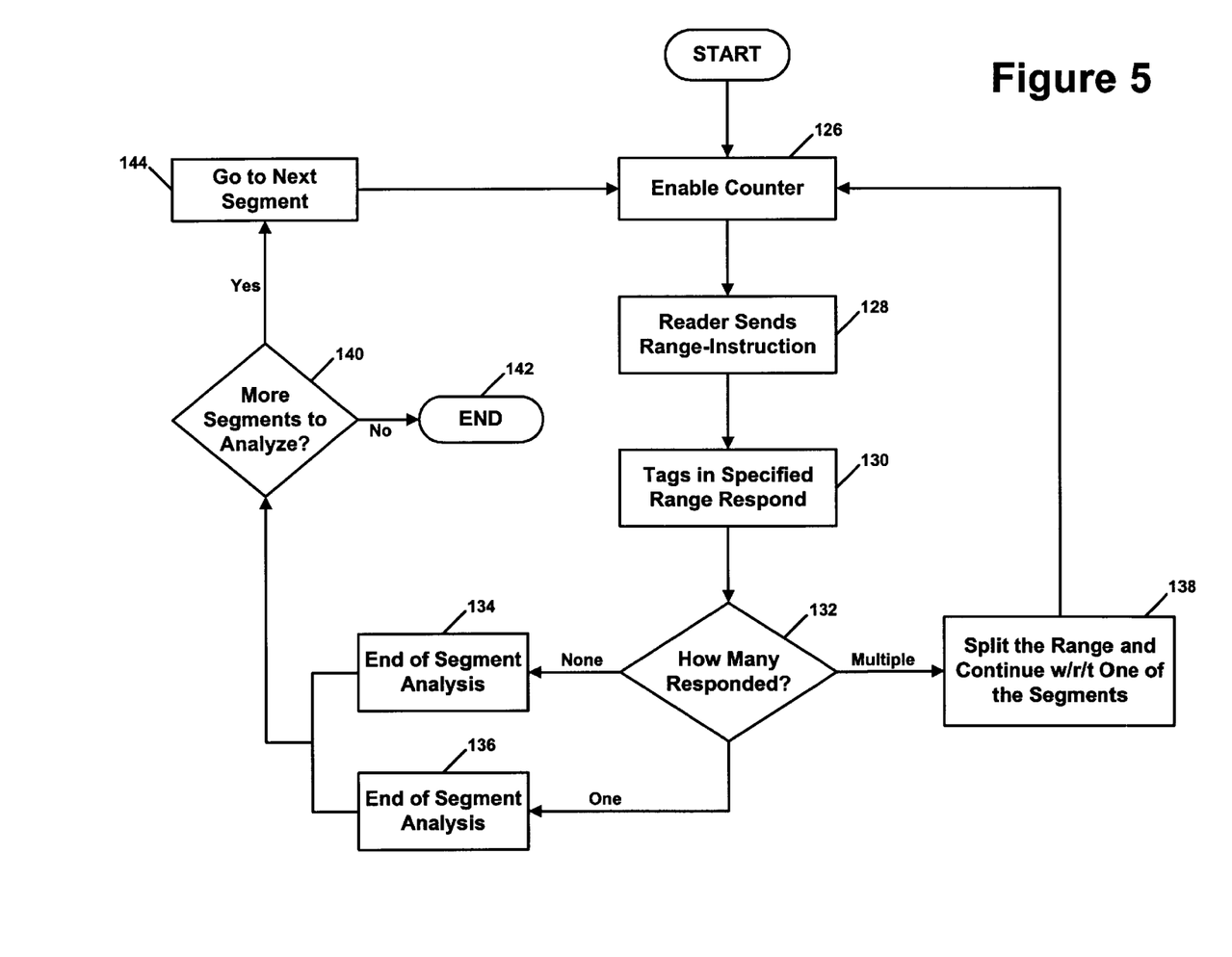
FIG. 5 is a flow chart depicting functional blocks that may be employed in accordance with an exemplary embodiment.
Figure 6:
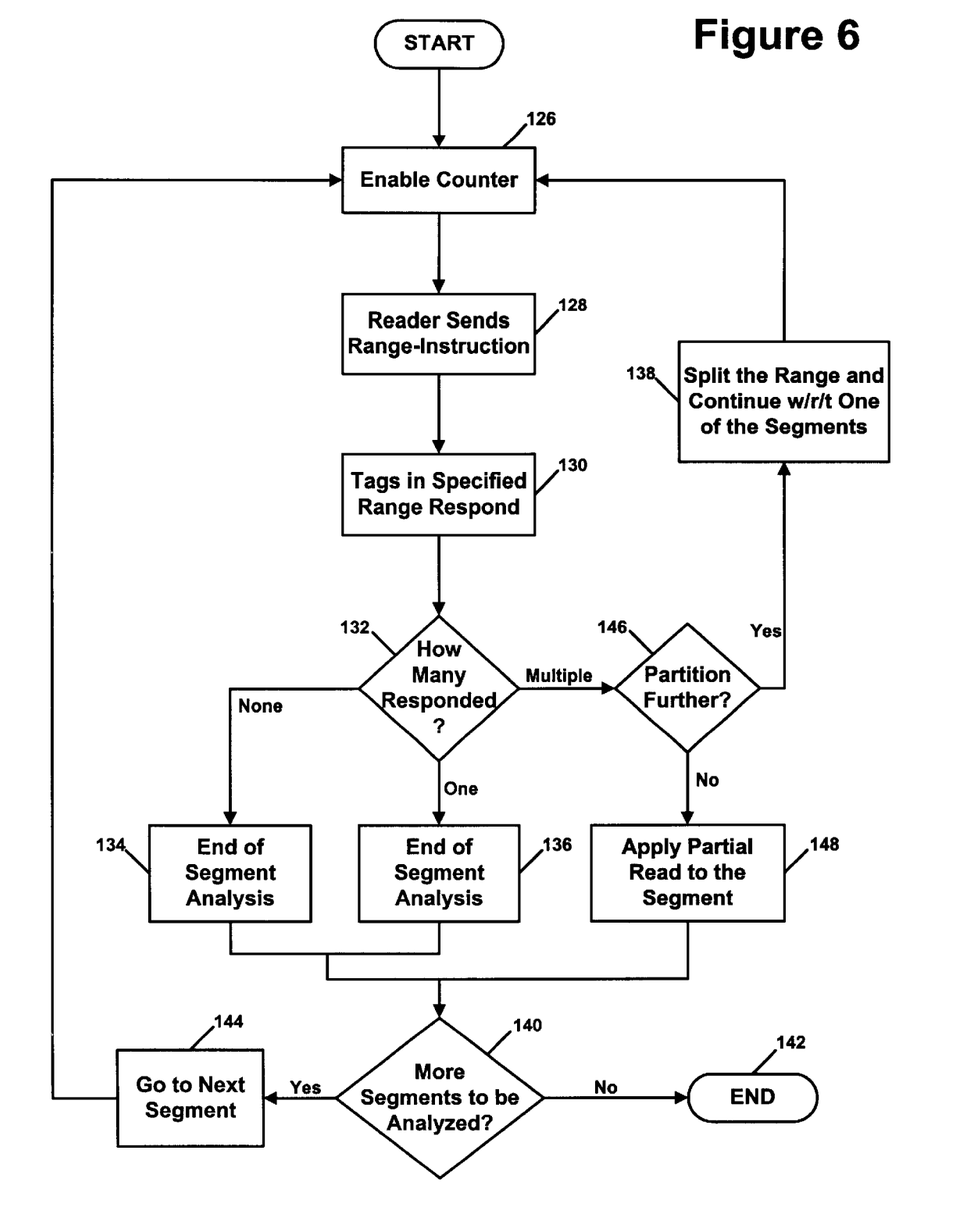
FIG. 6 is a flow chart depicting functional blocks that may be employed in accordance with another exemplary embodiment.

When reader 14 performs an identification process using the exemplary method, reader 14 may send a sequence of commands to tags in reader's field of view 52. According to the exemplary embodiment, each command could be a 14-bit command, for instance. However, commands with more or fewer bits could also be used. For instance, 5-bit commands or 7-bit commands could be sent from reader 14. FIGS. 5 and 6 provide flow charts illustrating functional blocks that may be carried out in the exemplary embodiment.

As shown in the Figures, at block 126, reader 14 may first send to the tags in its field of view 52 a 14-bit command to enable (e.g., clear or otherwise initialize) one of the counters, such as time slot counter 66, for instance. Each tag's instruction interpreter/control unit 64 may be arranged to respond to this command by clearing the specified counter.

At block 128, reader 14 may then send a 14-bit range-instruction that includes four bits corresponding to an upper bound range of a specific segment of the time slot register 68, four bits corresponding to a lower bound range of the specific segment of time slot register 68 and six remaining bits serving as an instruction identifier. According to the exemplary embodiment, the six-bit instruction identifier could instruct the tags in reader's field of view 52 to determine to whether an identification information value coded, for instance, in time slot register 68 is in the specified range and to reply if that coded value is in the specified range. Logic in the tag may the respond accordingly. In particular, when a tag receives the 14-bit command, the tag's range identifying logic 81 may operate to determine whether an identification value coded in time slot register 68 falls within the specified range.

In an exemplary embodiment, the upper bound and lower bound values provided by the first such range-instruction may define the entire set of possible time slot register values. Thus, for instance, the upper bound may be "1111" and the lower bound may be "0000", thereby defining the range "0000 0000 0000" through "1111 1111 1111". This first range-instruction thus serves to seek a response from any tags in the field of view, effectively facilitating a determination of whether any tags at all are present in the field of view.

At block 130, upon a receipt of the range-instruction, tags having their identification information values on time slot register 68 within the specified range would respond to reader 14. Thus, with the exemplary first range-instruction, tags having time slot register values between zero and 4095 (i.e., any tags) would respond to reader 14. Each such tag would therefore shift out its 44-bit identification information code (identification code and checksum) for transmission on the carrier frequency to reader 14.

At block 132, reader 14 may then determine if (i) no tags have responded, (ii) only one tag responded, or (iii) multiple tags responded concurrently. If no tags have responded, then, at block 134, reader 14 may conclude that the identification process is complete. If only one tag has responded, then, at block 136, reader 14 may also conclude that the identification process is complete. However, if multiple tags have responded concurrently, then reader 14 will have encountered a contention (indicated by an incorrect checksum, for instance). Consequently, reader 14 may proceed to block 138, in an effort to resolve the contention. Note that in an alternative embodiment, the reader can assume that some tags exist in its field of view and therefore that a contention would exist on analysis of the entire range of register values. Therefore, the reader can instead begin its identification analysis at block 138, rather than at block 126.

At block 138, the reader 14 may divide in half the number of possible count values within register 68 and proceed to test each half separately. In particular, with respect to each half segment, reader 14 may repeat the process beginning at block 126, but this time defining the range segment to be the respective half segment at issue. Referring to FIG. 4 and Table 1, if the time slot register 68 is a 12-bit register, for instance, the upper half range segment 98 (from "1000 0000 0000" through "1111 1111 1111", i.e., greater than 2048) could be specified by the upper bound value "1111" and the lower bound value "1000", and the lower half range segment 100 (from "0000 0000 0000" up to "1000 0000 0000", i.e., zero up to 2048) could be specified by the upper bound value "1000" and the lower bound value "0000". Other examples are possible as well.

Thus, reader 14 could next send a range-instruction seeking response from any and all tags that have time slot register values in the upper half range segment 98. Upon a receipt of this exemplary instruction, each tag that has its identification information values on time slot register 68 greater than or equal to 2048 would respond to reader 14. In particular, for any given tag in the field of view, if the identification value coded in the tag's time slot register 68 meets the criteria specified by this first request, the tag would shift out its 44-bit identification information code (identification code and checksum) for transmission on the carrier frequency to reader 14.

If reader 14 finds that no tags have responded to the range-instruction directed to the upper half range segment, the reader may properly conclude that no tags have identification codes within that upper half range, thereby conveniently eliminating the necessity to search any further in that range. If reader 14 finds that only one tag has responded to the range-instruction directed to the upper half range segment, the reader may conclude that the tag is the only one in that segment and, again, need not search further in the segment.

In turn, the reader may then send a range-instruction seeking response from any and all tags that have time slot register values in the lower half range segment 100. Upon a receipt of this exemplary instruction, tags having their identification information values on time slot register 68 within the range from zero up to 2048 would respond to reader 14. In particular, for any given tag in the field of view, if the identification value coded in the tag's time slot register 68 meets the criteria specified by this first request, the tag would shift out its 44-bit identification information code (identification code and checksum) for transmission on the carrier frequency to reader 14.

If reader 14 finds that no tags have responded to the range-instruction directed to the lower half range segment, the reader may properly conclude that no tags have identification codes within that upper half range, thereby conveniently eliminating the necessity to search any further in that range. If reader 14 finds that only one tag has responded to the range-instruction directed to the lower half range segment, the reader may conclude that the tag is the only one in that segment and, again, need not search further in the segment.

For any range segment as to which the reader detects a contention, the reader may then repeat this process recursively, splitting the segment into smaller segments and then performing the functions beginning with block 126, but for the new, smaller range segment values.

For instance, to resolve a contention associated with the lower half range segment 100, by way of example, reader 14 may first send a range-instruction seeking response from any and all tags that have time slot register values in the lower-most quarter 108 of the register's possible values. Continuing with the example above, this request would serve to test the range from "0000 0000 0000" up to "0100 0000 0000", for instance. Consequently, tags having their identification information values on time slot register 68 within the range 0 up to 1024 would respond to reader 14.

In turn, the reader may send a range-instruction seeking response from any and all tags that have time slot register values in the second lowest quarter 106 of the register's possible values. In the example above, this request would serve to test the range from "0100 0000 0000" up to "1000 0000 0000". Therefore, tags having their identification information values on time slot register 68 within the range 1024 up to 2048 would respond to reader 14.

Although FIG. 4 and Table 1 depict partitions down to 512 bit ranges, a reader in the exemplary embodiment could partition segments even further, and the segments could be any desired size or sizes, whether equal in size or not. (For instance, rather than splitting a segment into a ½ segment and another ½ segment, the reader could split a given segment into a ¼ segment and a ¾ segment if desired, and then analyze those unequal-sized segments respectively.)

As illustrated by FIG. 5, the reader can continue to apply the above process recursively to cover all possible values (i.e., down to one or more segments consisting of only one value each). Thus, at block 140, the reader may determine whether any additional segments remain to analyze. (E.g., if the reader has analyzed one of two half segments, the reader would determine that the other half segment still exists to be analyzed.) If no additional segments exist to be analyzed, then, at block 142 in FIG. 5, the reader may conclude that its tag identification process is complete. If an additional segment exists to be analyzed, then, at block 144 in FIG. 5, the reader may recursively return to block 126 for analysis of that segment.

Alternatively, and preferably, the reader may be programmed to partition only down to a particular sized segment, such as a 512 count segment for instance (or to a segment smaller than some threshold size). In each branch of the tree analysis, once the reader reaches that sized segment, if the reader still detects a contention in that segment, the reader may be programmed to resolve the contention by applying the partial read method (i.e., the incremental counting method) described above. Doing so may be particularly advantageous in a situation where many tags exist in the reader's field of view, because, in such a situation, many contentions might exist in almost any sized segment, and partitioning down to singleton segments (segments having only one value) would be laborious and inefficient.

This preferred combination of methods is illustrated in FIG. 6. Referring to FIG. 6, at block 146, when the reader has detected a contention with respect to a given segment, the reader determines whether the segment should be partitioned further. In the exemplary embodiment, if the segment is a 512-count segment, then the reader may conclude that it should not be further partitioned. Alternatively, if the segment is larger than 512 counts, then the reader may conclude that it may be further partitioned. Other bases for this determination are possible as well.

If the reader determines that further partitioning is appropriate with respect to the given segment, then the reader may proceed to block 138 and may proceed as described above. On the other hand, if the reader determines that further processing is not appropriate with respect to the given segment, then the reader may proceed to block 148. At block 148, the reader may then apply the partial read method in an effort to resolve the contention in the segment. After applying the partial read method, the reader may then proceed to block 140 as described above.

To apply the partial read process for a given segment, the reader may first send an enable instruction to the tags in its field of view, to initialize the counter associated with a particular register. The reader may then send to the tags in its field of view a value-instruction that causes the tags to set that counter to the minimum possible value in the segment at issue. For instance, if the segment at issue is segment 124 as shown in Table 1, the instruction may cause the tags to set their time slot counter 66 to 0000 0000 0000. In response to a value-instruction such as this, the instruction interpreter/control logic unit 64 of the tag may receive and compare the tag's time slot counter value with the tag's time slot register value. If a match exists, the instruction interpreter/control logic unit 64 may direct the LD/S out logic unit 80 to output the tag's full identification code and checksum.

In turn, the reader may then send a sequence of increment-instructions to the tags in its field of view. In response to each increment-instruction, the instruction interpreter/control logic unit 64 of each tag may cause the tag's time slot counter to increment by one, and the interpreter/control logic unit may then again compare the time slot counter value with the time slot register value. In each instance, if a match exists, the interpreter/control logic unit may direct the LD/S out logic unit 80 to output the tag's full identification code and checksum.

Thus, for each possible value in the range segment at issue, the reader may effectively poll the tags in its field of view to see if any tags have that value in the register at issue. If no tags respond, such as after a predetermined time period for instance, the reader may proceed to check for the next value. If only one tag responds, then the reader may conclude that the one tag is present in its field of view.

If more than one tag responds concurrently, then a contention exists, and the reader may then resolve the contention, for instance, by repeating the PSCS and/or partial read process in connection with another one of the registers (such as the wafer data register or manufacture information register) in the tags. In particular, for instance, the reader may store each count value as to which it received a contention with respect to a given, and the reader may seek to resolve that contention later through analysis of another one or more registers.

Beneficially, application of the exemplary PSCS method, whether alone or in combination with other methods (such as the partial read method for instance), can render the process of contention resolution and tag identification far more efficient. By searching in segments at a time, and narrowing the searching down in those segments where a contention occurs, the reader can quickly eliminate large sections of a register, without having to sequence through the possible values one by one. In a given segment, if no tags respond or if no contention occurs, the reader need not search any further. Thus, the reader may successfully identify the tags in its field of view by sending far fewer instructions than it might otherwise have had to send.

Other arrangements are possible as well. For instance, the reader may apply the partial read method with respect to a first register of the tags in its field of view and may then apply the PSCS method, alone or in combination with the partial read method, with respect to the other registers of the tags. As another example, if the reader applies the PSCS method and detects many contentions in the smallest range segments, the reader may instead just use the partial read method the next time it seeks to identify tags in its field of view. Similarly, if the reader applies the partial read method and finds that there are large groups of values as to which no tags respond, the reader may instead use the PSCS method the next time its seeks to identify tags in its field of view.

An exemplary embodiment of the present invention has been described. It will be understood, however, that changes and modifications may be made to the described embodiment without deviating from the spirit and scope of the invention, as defined by the following claims.

I claim:

1. A passive identification system comprising, in combination:
    a reader;
    a plurality of passive identification tags, each tag having a respective identification value, and each tag having a register value within a predetermined range;
    the reader being arranged to send a first range-instruction to the tags, the first range-instruction defining a preset value indicative of a first range of register values;
    each tag being arranged to receive the first range-instruction, to determine whether the tag's register value falls within the first range, and, in response to a determination that the tag's register value falls within the first range, to emit a signal defining the tag's respective identification value;

the reader being further arranged to detect a contention and to responsively split the first range into a plurality of second ranges and to send a plurality of second range-instructions to the tags, each second range-instruction defining a preset value indicative of a respective second range of the plurality of second ranges; and each tag being further arranged to receive each second range-instruction, to determine whether the tag's register value falls within the second range defined by the preset value of the second range-instruction, and, in response to a determination that the tag's register value falls within the second range defined by the preset value of the second range-instruction, to emit a signal defining the tag's respective identification value.

2. The system of claim 1, wherein each tag has a plurality of respective register values, and each tag's identification value is defined as a combination of the tag's respective register values.

3. The method of claim 1, wherein the reader is further arranged to detect a contention with respect to the second range and to responsively apply a partial read method to resolve the contention.

4. The method of claim 1, wherein the signal defining the tag's respective identification value further defines a checksum associated with the respective identification value.

5. The method of claim 1, wherein each passive identification tag is a radio frequency identification tag.

6. A method for identifying a plurality of passive identification tags in a field of view, each tag having a respective identification value, and each tag having a register value within a predetermined range, the method comprising:

splitting the predetermined range into a plurality of first sub-ranges;

a reader sending a first signal to the plurality of tags, the first signal containing a first preset value defining a given first sub-range of the plurality of first sub-ranges;

each tag of the plurality of tags receiving the first signal, responsively applying logic to determine whether the tag's register value falls within the given first sub-range, and sending a response signal if the tag's register value falls within the given first sub-range;

the receiver detecting a contention among responses from multiple tags, and the receiver thereafter responsively (i) splitting the given first sub-range into a plurality of second sub-ranges and (ii) sending a second signal to the plurality of tags, the second signal containing a second preset value defining a given second sub-range of the plurality of second sub-ranges; and each tag of the plurality of tags receiving the second signal, responsively applying logic to determine whether the tag's register value falls within the given second sub-range, and sending a response signal if the tag's register value falls within the given second sub-range.

7. The method of claim 6, wherein the response signal of the tag whose register value falls within the given second sub-range comprises an identification value of the tag.

8. The method of claim 7, wherein the response signal further comprises a checksum of the tag.

9. The method of claim 6, wherein the response signal of the tag whose register value falls within the given first sub-range comprises an identification value of the tag.

10. The method of claim 9, wherein the response signal further comprises a checksum of the tag.

11. The method of claim 6, wherein the first preset value indicates an upper bound of the given first sub-range and a lower bound of the given first sub-range.

12. The method of claim 11, wherein the preset value indicates four most significant bits defining an upper bound of the first given sub-range and four most significant bits defining a lower bound of the first given sub-range.

* * * * *

UNITED STATES PATENT AND TRADEMARK OFFICE
CERTIFICATE OF CORRECTION

PATENT NO.    : 6,725,014 B1
DATED         : April 20, 2004
INVENTOR(S)   : Kevin D. Voegele It is certified that error appears in the above-identified patent and that said Letters Patent is hereby corrected as shown below:

Column 3,
Line 1, please delete "is".

Column 6,
Line 34, please replace "fiction" with -- function --.

Column 10,
Line 27, please insert -- other range bounds -- after "and that".

Signed and Sealed this

Thirteenth Day of July, 2004

JON W. DUDAS
*Acting Director of the United States Patent and Trademark Office*